United States Patent Office 3,155,687
Patented Nov. 3, 1964

3,155,687
PREPARATION OF TRIMELLITIC INTER-MOLECULAR DOUBLE ANHYDRIDE
Delbert H. Meyer, Highland, Ind., assignor to Standard Oil Company, Chicago, Ill., a corporation of Indiana
No Drawing. Filed Apr. 19, 1962, Ser. No. 188,863
2 Claims. (Cl. 260—346.3)

This invention relates to trimellitic double anhydride and more particularly concerns an improved process for the production of this compound.

The double anhydride of trimellitic acid, i.e., an intermolecular anhydride of 2 mols of the intra-molecular trimellitic anhydride, is useful as a highly advantageous intermediate in the preparation of valuable ester and resin products as more fully described in U.S. Patent 2,911,416 to Knoblock and Liao.

By the methods heretofore available trimellitic double anhydride could be produced only by a process which required the use of chemical reagents and a fairly involved process for working up the product. The prior art process involves the preparation of an intermediate intermolecular anhydride of acetic acid and trimellitic acid as disclosed in U.S. Patent 2,996,520 to Knoblock and Liao, converting part of the acetic (trimellitic anhydride) anhydride to the double anhydride of trimellitic acid, and thereafter recovering the trimellitic double anhydride from the acetic (trimellitic anhydride) anhydride by a rather complicated refluxing and distillation procedure followed by recrystallization from ethyl acetate which itself has been specially purified.

I have now discovered an improved method for preparing and purifying trimellitic double anhydride. My process consists of heating trimellitic acid or trimellitic anhydride or mixtures thereof to elevated temperatures under conditions favorable for water removal for a length of time sufficient to form a substantial amount of the double anhydride and thereafter recovering the trimellitic double anhydride from the heating mixture, conveniently by distillation, suitably under reduced pressure. By this method I am able to produce trimellitic double anhydride of excellent purity without the use of chemical reagents or complicated product recovery and purification techniques. My process requires only a heating system, a water removal system and a distillation system, all of which are simple to operate.

To promote the elimination of water from the heating mixture it is advantageous to carry out the heating step under reduced pressure, suitably about 5 mm. Hg absolute pressure. Alternatively the heating may be accomplished at higher pressure, say atmospheric pressure while maintaining an inert gas blanket, such as a nitrogen blanket, over the heating mixture. In either case the partial pressure of water over the heating mixture is reduced thereby promoting anhydride formation by eliminating water from the heated materials.

The time required for the heating step will depend somewhat on the nature of the starting materials, e.g. trimellitic acid, trimellitic anhydride or mixtures thereof, and the temperature at which the heating step is conducted. Thus when the starting material is trimellitic anhydride the heating step can usually be completed in about 2–30 hours at a temperature of from about 250°–350° C. When the starting material is or contains trimellitic acid, time must be added for the conversion of the acid to the intra-molecular anhydride which is subsequently converted to the inter-molecular anhydride on further heating. It will be understood that when the starting material is or contains trimellitic acid that the water thus eliminated derives from both the formation of the intra-molecular anhydride as well as the subsequent formation of the inter-molecular or double anhydride.

The heating step at reduced pressure is conveniently carried out by charging the trimellitic acid or anhydride to a closed vessel equipped with a distillation column and an overhead condenser whereby the water eliminated during the heating can be removed from the system and the vaporized trimellitic acid or trimellitic anhydride can be condensed and returned to the heating zone. When operating at higher pressures with an inert gas blanket it is advantageous to provide for purging the inert gas which contains water vapor and continuously replace the purged moisture containing inert gas with dry inert gas.

Upon the completion of the heating step the resulting heated mixture may contain both trimellitic anhydride and trimellitic double anhydride. The double anhydride is recovered conveniently by vacuum distillation, suitably at 1 to 5 mm. absolute pressure, to obtain a forecut of trimellitic anhydride and a heartcut of the double anhydride. The temperature in the still bottom is suitably 320–330° C.

The following example is submitted to more clearly illustrate my invention.

*Example*

1900 g. of trimellitic anhydride was distilled at 5 mm. Hg absolute pressure through an "Oldershaw" column with a pot temperature of 250–279° C. throughout most of the distillation which took 9.5 hours. During the last hour the pot temperature gradually rose to 316° C. The residue from this distillation, amounting to 206 g., was distilled at 1 mm. Hg absolute pressure to obtain a forecut of trimellitic anhydride and a 150 g. heartcut of the double anhydride. The pot temperature during this distillation was 320–330° C. The heartcut product analyzed 98.6 percent pure, trimellitic double anhydride.

From the foregoing example it is apparent that I have discovered a simple and convenient method of producing trimellitic double anhydride. Surprisingly enough, the conversion of the intra-molecular anhydride to the intermolecular anhydride can be obtained by a simple heating process whereas the methods heretofore available require chemical reagents. Furthermore, it is also surprising that the product which is organic in nature can be distilled at temperatures greater than 300° C. without causing decomposition; this is in direct contravention to the McKinnis patents, U.S. 2,729,674 and U.S. 2,734,914, which teach that trimellitic acid is decarboxylated by heating in this temperature range.

Having fully described my invention and the practice thereof, I claim:

1. The process of making trimellitic intermolecular double anhydride which consists essentially of distilling in the essential absence of any chemical dehydrating reagents a compound selected from the class consisting of trimellitic acid, trimellitic intra-molecular anhydride and mixtures thereof at a pot temperature in the range of about 250° C. to about 350° C., at a total partial pressure of water, trimellitic acid, trimellitic intra-molecular anhydride and trimellitic intermolecular double anhydride in the range of between about 0.001 and 0.01 atmospheres absolute, removing water from the distillation zone, continuing the distillation under conditions within the foregoing ranges, and recovering as a distillate product trimellitic intermolecular double anhydride.

2. The process of claim 1 wherein the pot temperature during the recovery of trimellitic intermolecular double anhydride is in the range of between about 300° C. and about 350° C.

References Cited in the file of this patent

UNITED STATES PATENTS

| | | |
|---|---|---|
| 2,888,465 | Hodes | May 26, 1959 |
| 2,911,416 | Knoblock et al. | Nov. 3, 1959 |
| 2,971,011 | Liao et al. | Feb. 7, 1961 |